June 25, 1946. C. F. LEATHERS 2,402,646
WELDING ELECTRODE
Filed July 10, 1944
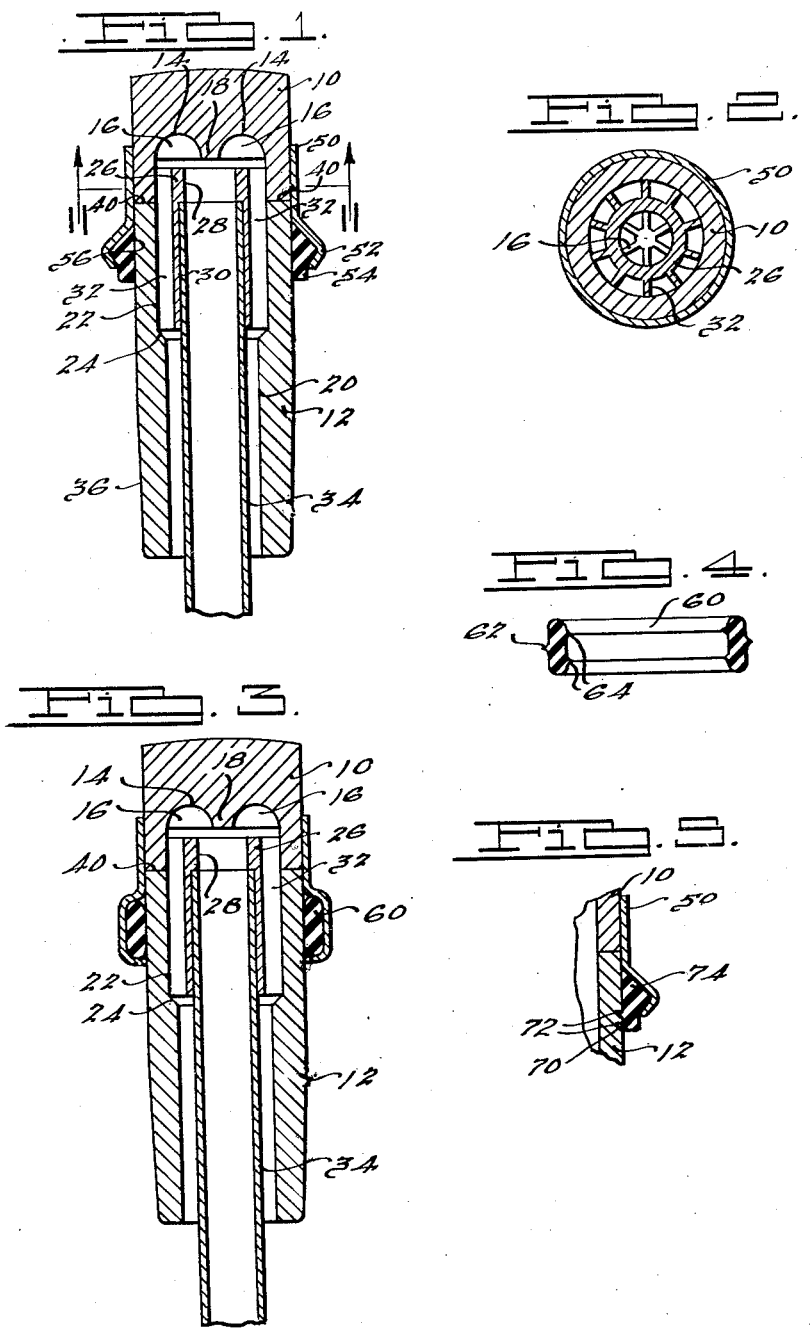
INVENTOR.
Chester F. Leathers
BY
Harness, Dickey & Pierce
ATTORNEYS.

Patented June 25, 1946

2,402,646

UNITED STATES PATENT OFFICE 2,402,646

WELDING ELECTRODE

Chester F. Leathers, Detroit, Mich.

Application July 10, 1944, Serial No. 544,180

5 Claims. (Cl. 219—4)

The present invention relates to heating elements for use in carrying heating current which passes through work engaged thereby, and in particular provides improved constructions of welding electrodes particularly suited for resistance spot welding. In certain of its aspects, the present invention provides improvements upon the structures described and claimed in Johnson application Serial No. 480,742, filed March 27, 1943.

As will be understood in conventional resistance welding operations, the work to be welded is engaged between a pair of opposed electrodes and the welding current is caused to flow through these electrodes and through the work, so as to cause the engaging work surfaces to be heated sufficiently to cause the formation of the weld nugget. In these operations, it has become conventional to provide for artificially cooling the electrodes by providing inflow and outflow passages through the electrode body, through which a suitable coolant can be circulated. More particularly, it has been the practice to provide the electrode with a longitudinally extending bore which extends to within a predetermined distance of the work engaging face of the electrode and to provide the electrode holder with a so-called deflector tube which, when the electrode is fitted to the holder, projects into the just-mentioned bore to a point within a predetermined distance of the end of the bore. The practice has been to introduce the coolant through the deflector tube and allow it to be discharged from the electrode through the annular bore space which surrounds the tube.

The above practice has lead to considerable difficulty, due largely to the fact that in applying different size electrodes to the holder, the spacing between the end of the deflector tube and the end of the electrode cavity varies, thus altering the effectiveness of the coolant circuit. One object of the present invention is to so construct the electrode as to enable it to itself define its inflow and outflow passages, whereby variations of the above sort are avoided.

Conventionally, the aforesaid electrodes have been made in one piece and the aforesaid bore has been terminated a substantial distance from the work engaging face of the electrode, to allow for a series of point dressing operations. After such dressing operations have removed the tip metal to within a certain distance of the end of the bore, it has been the practice to scrap the entire electrode. This practice is objectionable, both from the standpoint of the relatively large mass of material which is thus scrapped and also because successive tip dressing operations, by bringing the end of the coolant passage progressively nearer to the work engaging face, alter the effectiveness of the cooling circuit. It has heretofore been proposed to overcome this difficulty by providing the electrode body with a replaceable tip. It has further been proposed to form the tip of a hardened material.

In accordance with the invention of the aforesaid Johnson application, the coolant passages are formed in part in the tip and in part in the body. More particularly, the body is provided with concentrically arranged inflow and outflow passages, and the tip is formed with a pocket which communicates with both of such inflow and outflow passages. With this arrangement, in which the pocket in the tip extends to a point immediately adjacent the work engaging face of the tip, the above mentioned deflector tube difficulties are entirely obviated, since the deflector tube, instead of determining the proximity of the inflow passage to the tip face, need only extend sufficiently far into the inflow passage of the body to connect to the latter passage.

The present invention is directed primarily to the provision of an improved connection between the body and the tip, which can be broadly characterized in that it permits tips to be very freely, and manually, removed from and applied to the body.

More particularly, it is the principal object of the present invention to provide a structure wherein the tip and body are provided with telescopically related slidable surfaces, which abut but are not bonded to each other, and wherein frictional resistance is relied upon to retain the elements in assembled relation to each other.

A more detailed object of the invention is to provide such a structure employing sealing means to prevent leakage between the body and the tip, and which sealing means in itself adds substantially to the frictional holding relation between the body and the tip.

With the above, as well as other and more detailed objects in view, which appear in the following description and in the appended claims, preferred but illustrative embodiments of the invention are shown in the accompanying drawing, throughout the several views of which corresponding reference characters are used to designate corresponding parts, and in which:

Figure 1 is a view in longitudinal section of a welding point embodying the invention;

Fig. 2 is a view in horizontal section, taken along the line 2—2 of Fig. 1;

Fig. 3 is a view in longitudinal central section of a modification of the invention;

Fig. 4 is a view of the sealing element used in Fig. 3, and

Fig. 5 is a fragmentary view of a further modification of the invention.

Referring first to Figs. 1 and 2, the illustrated welding point comprises a tip 10 and a body 12. Body 12 may be and preferably is formed of conventional electrode material, such as hard-drawn copper and certain of the alloys thereof. Tip 10 may be and preferably is formed of hard-drawn copper, hardened by a coining or equivalent operation which serves to reduce it from slug-like form to the indicated form. As indicated, body 10 is provided with a coolant receiving pocket composed of a plurality of circumferentially distributed pocket sections 14 which are separated by radially extending ribs 16. The central junction between the ribs 16 being in the form of a central column 18.

The body 12 is provided with a bore portion 20, and a somewhat larger counterbore section 22, which join each other at a sloping shoulder 24. The counterbore portion 22 receives, with a pressed fit, a passage defining member 26, having centrally bored portions 28 and 30, and a plurality of longitudinally extending, circumferentially distributed grooves 32 in its surface. The respective grooves 32, which preferably correspond in number and spacing to the pocket sections 14, define with the adjacent wall portions of the bore 22 and the tip 10, a plurality of circumferentially distributed coolant passages. The bore portion 30 is larger than the bore portion 28 by an amount sufficient to accommodate the usual deflector tube 34, which, it will be understood, may if desired be introduced into the welding point to the limit position indicated in the drawing. The coolant circuit may be completed, however, simply by introducing the deflector tube 34 a short distance into the bore 30.

The outer surface of the body 12 is tapered in the region indicated by the reference character 36, to accommodate it to the usual electrode holder (not shown) and which holder may also receive the exposed end of the deflector tube.

With this arrangement, it will be appreciated that the coolant circuit may extend from the holder (not shown) to the deflector tube, bore portion 28, the several tip pockets 14, and thence to exhaust through the circumferentially spaced passages 32, the bore portion 20 and the associated holder.

As thus far described, the construction is in accordance with the invention of the aforesaid Johnson application. Coming now to the features which distinguish the present invention, it will be noted that the insert 26 projects beyond the body 12 a short distance, the tip 10 being telescoped over such outwardly extending part of the insert 26. This telescoping fit, which is preferably an easy but snug fit, brings the ends of the body and tip together along the junction line indicated at 40. In accordance with the present invention, this end surface, as well as the telescoped surfaces, are preferably silver plated or provided with any other surface coating which, in an oxidized or unoxidized condition, is a high-grade conductor of electricity.

In further accordance with the present invention, the tip 10 and body 12 are provided with additional telescoped, frictionally engaged, longitudinally slidable surfaces, which augment the holding action of the previously mentioned telescopically related surfaces by an amount sufficient to provide an adequate connection between the body and the tip, and which also provide an effective fluid seal between the body and the tip. More particularly, in this instance, the tip 10 is provided with an outer metallic sleeve 50, which may have a shrink fit thereon, and which is radially enlarged adjacent its lower end, as indicated at 52, so as to define a pocket within which a sealing gasket 54 is received. Gasket 54 may be formed of any suitable material, a relatively soft rubber-like material, either natural or synthetic, being preferred. The inner face 56 of gasket 54 directly abuts the outer surface of body 12 throughout a substantial length, thus affording a substantial frictional holding effect. This holding effect is augment by the sliding fit of the sleeve 50 with respect to the outer surface of body 12. As shown, the upper marginal edge of gasket 54 is relatively thin or feathered so that any liquid which may escape at the joint 40 and pass along the inner surface of the sleeve 50, causes such feathered edge to more tightly hug the surface of body 12. Gasket 54 thus provides an exceedingly efficient fluid seal.

The embodiment of Figs. 3 and 4 duplicates that of Figs. 1 and 2, with the exception that in this instance a sealing gasket 60 of different configuration is employed. Gasket 60, in an unstressed condition assumes the shape indicated in Fig. 4, in which one or more relatively small ribs 62 project from the outer surface thereof, and one or more annular ribs 64 project from the inner surface thereof. When gasket 60 is applied to the associated tip 10, and the latter is applied to the associated body 12, ribs 62 and 64 are compressed into the body of the gasket. When so compressed, however, they define localized regions of a higher pressure between the elements and under certain conditions are found to improve the sealing action.

In use, it will be appreciated that the tips of Figs. 1 through 4 may be applied to and removed from the associated bodies 12 with a minimum of effort. In many cases, it has been found that a sufficient frictional holding effect between the tip and the body, to withstand the pressure of the coolant, may be obtained and still provide a construction which an operator can assemble or disassemble entirely manually. It will be understood, of course, that if additional holding effect is desired, the sliding fits may be made closer, and the slidably engaged surfaces, both metallic and gasket, may be made longer. In such event, pliers or similar tools may be conveniently used in separating the tips from the bodies. It will, of course, be understood that when the welding point is passing current, the pressure applied between the holder and the work serves to maintain the body and tip surfaces in firm engagement with each other, the frictional holding effect being relied on only during the intervals between welds.

The remaining embodiment, Fig. 5, distinguishes from the embodiments of Figs. 1 through 4 only that in this instance the holding effect is augmented by providing the electrode body with one or more annular curves 70, which receive corresponding ribs 72 on the associated gasket 74 and which grooves and ribs afford a mechanical interlock.

It will be appreciated from the foregoing that the present invention provides extremely simple welding point constructions, characterized as providing a very efficient cooling arrangement, and further characterized as providing an extremely simple and efficient method of securing the tip to the body. Although only several specific embodiments of the invention have been described in detail, it will be appreciated that various further modifications in the form, number and arrangement of parts may be made without departing from the spirit and scope of the invention.

What is claimed is:

1. In a heating element for conducting heating current which passes through work, the combination of a body and a work engaging tip, said body and tip having cooperating surfaces which cooperate to define a coolant circuit through the element, said body and tip having telescopically related slidably engaged surfaces which enable the same to be assembled and disassembled without establishing or disrupting a bond therebetween, and sealing means cooperating between the body and tip for preventing leakage of coolant at the junction therebetween and for holding said surfaces in engagement with each other.

2. In a heating element for conducting heating current which passes through work, the combination of a body and a work engaging tip, said body and tip having cooperating surfaces which cooperate to define a coolant circuit through the element, and means including means forming a fluid seal for holding said body and tip in engagement with each other and for preventing leakage of coolant at the junction therebetween.

3. The structure of claim 2 wherein said body has separate inflow and outflow passages and the tip has a pocket through which said passages communicate.

4. The structure of claim 2 wherein said body and tip have abutting end surfaces and telescopically interfitting side surfaces, said end surfaces being tightly pressed together when pressure is applied between the element and the work.

5. The structure of claim 2 wherein said body and tip have abutting end surfaces and telescopically interfitting side surfaces, said end surfaces being tightly pressed together when pressure is applied between the element and the work, and said sealing means being interposed between at least certain of said side surfaces.

CHESTER F. LEATHERS.